(12) United States Patent
Komori

(10) Patent No.: US 7,524,115 B2
(45) Date of Patent: Apr. 28, 2009

(54) ROLLING BEARING

(75) Inventor: Kazuo Komori, Iwata (JP)

(73) Assignee: NTN Corporation, Osaka (JP)

( * ) Notice: Subject to any disclaimer, the term of this patent is extended or adjusted under 35 U.S.C. 154(b) by 343 days.

(21) Appl. No.: 10/582,854

(22) PCT Filed: Dec. 13, 2004

(86) PCT No.: PCT/JP2004/018559

§ 371 (c)(1),
(2), (4) Date: Jun. 14, 2006

(87) PCT Pub. No.: WO2005/059386

PCT Pub. Date: Jun. 30, 2005

(65) Prior Publication Data
US 2007/0147719 A1    Jun. 28, 2007

(30) Foreign Application Priority Data

| Dec. 16, 2003 | (JP) | ............................. 2003-418250 |
| Feb. 27, 2004 | (JP) | ............................. 2004-052917 |

(51) Int. Cl.
*F16C 19/08* (2006.01)
(52) U.S. Cl. ...................... 384/476; 384/544
(58) Field of Classification Search ......... 384/476–477, 384/492, 544, 586–589; 148/247, 267, 632, 148/652; 428/472; 301/6.1, 105.1, 124.1; 29/898.04, 898.06; 188/18 A, 218 XL See application file for complete search history.

(56) References Cited

U.S. PATENT DOCUMENTS

| 5,663,640 | A | * | 9/1997 | Sakamoto ................... 324/173 |
| 6,250,814 | B1 | | 6/2001 | Tajima et al. |
| 6,309,110 | B1 | * | 10/2001 | Tajima et al. ................ 384/544 |
| 6,357,557 | B1 | * | 3/2002 | Di Ponio ................... 188/18 A |
| 6,357,925 | B2 | | 3/2002 | Tajima et al. |
| 6,626,579 | B1 | * | 9/2003 | Silvasi ......................... 384/476 |
| 6,858,098 | B2 | * | 2/2005 | Oshima et al. .............. 148/267 |
| 6,929,331 | B2 | * | 8/2005 | Ohtsuki .................... 301/105.1 |
| 2002/0117236 | A1 | * | 8/2002 | Matzdorf et al. ............ 148/247 |
| 2003/0121570 | A1 | | 7/2003 | Oshima et al. |
| 2003/0148122 | A1 | | 8/2003 | Oshima et al. |
| 2003/0190492 | A1 | * | 10/2003 | Wada et al. ................. 428/659 |

(Continued)

FOREIGN PATENT DOCUMENTS

EP    800011 A2 *  10/1997

(Continued)

OTHER PUBLICATIONS

Japanese Patent Office Decision of Rejection, mailed Apr. 24, 2007 and issued in corresponding Japanese Patent Application No. 2003-418250.

(Continued)

*Primary Examiner*—Marcus Charles

(57) ABSTRACT

A rolling bearing including an outer member having an inner peripheral surface formed with raceway surfaces of double rows, an inner member having an outer peripheral surface formed with raceway surfaces opposed to the raceway surfaces of the outer member, and double rows of rolling elements interposed between the opposed raceway surfaces. A surface of at least one of the outer member and the inner member that contacts a member made of an aluminum alloy is provided with an electrocorrosion preventive coating containing hexavalent chrome-free chromate.

2 Claims, 8 Drawing Sheets

U.S. PATENT DOCUMENTS

2004/0046441 A1  3/2004  Ohtsuki

FOREIGN PATENT DOCUMENTS

| | | |
|---|---|---|
| EP | 1318213 A2 * | 6/2003 |
| JP | 51-34369 | 3/1976 |
| JP | 60-101331 | 6/1985 |
| JP | 2-50563 | 4/1990 |
| JP | 3-119615 | 12/1991 |
| JP | 04-368202 | 12/1992 |
| JP | 5-52223 | 3/1993 |
| JP | 05-45248 | 6/1993 |
| JP | 2000-301401 | 10/2000 |
| JP | 2002-362106 | 12/2002 |
| JP | 2003-072310 | 3/2003 |
| JP | 2003-166078 | 6/2003 |
| JP | 1 418 066 A2 | 5/2004 |
| JP | 2005-022541 | 1/2005 |
| JP | 2005-054910 | 3/2005 |

OTHER PUBLICATIONS

Japanese Patent Office Notice of Preliminary Rejection, mailed Dec. 19, 2006, and issued in corresponding Japanese Patent Application No. 2003-418250.

* cited by examiner

ROLLING BEARING

This application claims the benefit of PCT International Application Number PCT/JP2004/018559 filed Dec. 13, 2004 and Japanese Application Nos. 2003-418250, filed Dec. 16, 2003 and 2004-052917, filed Feb. 27, 2004 in Japan, the disclosures of which are incorporated herein by reference.

FIELD OF THE INVENTION

The present invention generally relates to a rolling bearing and, more particularly, to the rolling bearing suitable for use in vehicle wheels of an automotive vehicle.

BACKGROUND ART

In the automobile bearing used in the vehicle wheels, one of outer and inner members each having raceway surfaces for rolling elements, which serves as a rotatable member, is provided with a wheel mounting flange for the support of a vehicle wheel, and a rim of the vehicle wheel is fitted to this flange together with a brake rotor held in overlapping relation with the rim of the vehicle wheel. (See, for example, the Japanese Laid-open Patent Publication No. 2000-301401.)

The brake rotor, which is one of members that contact the bearing, is made of iron, which is a mainstream material therefor, but a strong demand has been made to reduce the weight of various component parts of an automotive vehicle in order to increase the mileage. Accordingly, attempts have been made to use the brake rotor made of an aluminum alloy. Considering that the aluminum alloy has a specific gravity that is about one third of that of steel, the brake rotor of the aluminum alloy is lighter in weight than the conventional brake rotor made of iron even if it is designed to have a thick wall structure in order to compensate for the shortage of rigidity as compared with steel. In the future, for reduction of the weight, the use of the brake rotor made of the aluminum alloy will increase.

However, the brake rotor made of the aluminum alloy and the steel rotatable member formed with the wheel mounting flange in the wheel support bearing tend to have a material relation to develop a metal-to-metal potential difference. For this reason, in the event that a surface of the rotatable member held in contact with the brake rotor is exposed to, for example, muddy salt water, an electric battery circuit tends to be formed between the rotatable member and the brake rotor, which eventually leads to electrode corrosion. Once the electrode corrosion occurs, sticking occurs in that contact surface, resulting in the workability during repair and/or inspection in the market being lowered. Although this electrode corrosion can be avoided when an insulating member is arranged between the rotatable member and the brake rotor, the number of component parts used increases and, for that reason, not only will the control of the component parts become complicated, but also mounting of the vehicle wheel onto the wheel support bearing will also become time-consuming and laborious.

On the other hand, a knuckle, which is one of the members that contact the bearing used for supporting the vehicle wheels, is widely made of an aluminum alloy for the purpose of weight reduction. A problem associated with corrosion resulting from formation of the battery circuit is similarly found between the knuckle made of the aluminum alloy and the outer member of the wheel support bearing. To cope with this problem, it is suggested to apply, as a coating treatment excellent in electric corrosion prevention, a Zn—Ni plating and a chromate treatment using hexavalent chromium to a surface of the wheel support bearing that contacts the knuckle. See, for example, the Japanese Patent Application No. 2002-266051.

However, the chromate used in the practice of the conventional chromate treatment for the prevention of the electric corrosion contains hexavalent chromium, which is an environmentally harmful substance. With the environmental concern rising in recent years, efforts have been made to restrict the use of hexavalent chromium. By way of example, the hexavalent chromium will no longer be used according to the European environmental regulation.

DISCLOSURE OF THE INVENTION

An object of the present invention is to provide a rolling bearing, in which the electric corrosion can be prevented even when a member which contacts the rolling bearing is made of an aluminum alloy and in which a harmful substance hazardous to the environment is not used in the surface treatment.

Another object of the present invention is to provide the rolling bearing for use in a vehicle wheel, in which the electric corrosion can be prevented even though a brake rotor made of an aluminum alloy is used and in which sticking of the brake rotor to the rolling bearing can be suppressed.

A rolling bearing according to a first construction of the present invention includes an outer member having an inner peripheral surface formed with raceway surfaces of double rows, an inner member having raceway surfaces opposed to the raceway surfaces of the outer member, and rows of rolling elements interposed between the opposed raceway surfaces, in which a surface of at least one of the outer member and the inner member that contacts a member made of an aluminum alloy is provided with an electrocorrosion preventive coating containing hexavalent chrome-free chromate. The hexavalent chrome-free chromate referred to above is a chromate containing, as a principal component, chromium sulfate or chromium nitrate and containing no hexavalent chrome. The rolling bearing of the present invention may be any bearing of a rolling type and may be either a radial bearing or a thrust bearing.

According to this first construction, since the outer and inner members of the bearing are generally made of steel, if the member that contacts the outer or inner member is made of an aluminum alloy, the outer or inner member and the member that contacts the inner or outer member have a metal-to-metal relation to develop a potential difference relative to each other, but if the electrocorrosion preventive coating is provided on the surface of the outer member or the inner member in contact with such member, there is no possibility of the battery circuit established at the contact surface even though the contact surface is exposed to muddy salt water and, therefore, it is possible to avoid the electrode corrosion. Also, since the electrocorrosion preventive coating is provided, there is no increase of the number of component parts used and complication of the control of the component parts and reduction of the assemblability can be avoided, unlike the case in which a separate insulating member is intervened between the outer or inner member and the member in contact with the outer or inner member.

Since the hexavalent chrome-free chromate is used in the electrocorrosion preventive coating, it is possible to render the coating to be non-hazardous. Also, according to a series of tests conducted, it has been confirmed that even though the hexavalent chrome-free chromate is used, proper selection of, for example, a plated layer for backing preparation can render the coating to be more excellent in electrocorrosion prevention than an electrocorrosion preventive coating utilizing the hexavalent chrome containing chromate.

In the first construction, the outer member of the rolling bearing of the present invention may be fitted to the contact member, for example, a housing made of an aluminum alloy.

Also, the rolling bearing according to the first construction can be applied to a rolling bearing for a vehicle wheel for rotatably supporting the vehicle wheel relative to a vehicle body structure. The contact member may be a knuckle and, in such case, the outer member may have an outer peripheral surface formed with a vehicle body fitting flange for securement to the knuckle and an inner peripheral surface formed with the raceway surfaces for the double rows, whereas the inner member may have one end formed with a wheel mounting flange and have an outer peripheral surface formed with the raceway surfaces opposed to the respective raceway surfaces, with the rows of the rolling elements interposed between those opposed raceway surfaces. It is to be noted that the electrocorrosion preventive coating may be provided in the entire surface of the outer member that is held in contact with the knuckle or in a part thereof.

In automotive vehicles, reduction of the weight thereof is desired and the knuckle by which the wheel support bearing is carried has come to be increasingly made of an aluminum alloy. Also, since the wheel support bearing is used under a severe condition in which it tends to be wetted with muddy salt water, the use of the knuckle made of the aluminum alloy tends to cause a problem associated with electrode corrosion resulting from formation of a battery circuit between the knuckle and the outer member. Accordingly, an electrocorrosion preventive treatment is strongly desired. In order to increase the productivity, it is difficult to arrange an electrically insulating material, which is a separate member, between the knuckle and the outer member and a strict consideration to the environmental aspect is requested. Because of these, effects of suppression of the electrocorrosion and removal of a hazardous matter, which result from the provision of the electrocorrosion preventive coating containing the hexavalent chrome-free chromate in accordance with the present invention, can be effectively exhibited.

The electrocorrosion preventive coating is preferably of a three layered structure including a first plated layer provided on the surface of the base metal, a chromate layer of hexavalent chrome-free chromate overlaid on an outer surface of the first plated layer, and a resin layer of a resin system overlaid on an outer surface of the chromate layer, for example, a resin layer of a heat curable coating material. The first plated layer is, for example, a zinc-nickel plated layer.

When designing the coating layer to be the three layered structure as a top coating as described above, the effect of suppressing the electrocorrosion further becomes excellent.

As a result of test, it has been confirmed that where the first plated layer is employed in the form of a zinc-nickel plating and the three layered structure is employed for the electrocorrosion preventive coating, the coating can be rendered to be more excellent in electric corrosion prevention than the corrosion preventive coating having the similar three-layer structure but containing the hexavalent chrome containing chromate.

The rolling bearing according to a second construction of the present invention is a rolling bearing for a vehicle wheel for rotatably supporting the vehicle wheel relative to a vehicle body structure, which includes an outer member having an inner peripheral surface formed with raceway surfaces of double rows, an inner member having an outer peripheral surface formed with raceway surfaces opposed to the raceway surfaces of the outer member, and double rows of rolling elements interposed between the opposed raceway surfaces. One of the outer member and the inner member, which serves as a rotatable member, has a wheel mounting flange adapted to support a rim of the vehicle wheel through a brake rotor made of an aluminum alloy. An electrocorrosion preventive coating is provided on a surface of the flange that may be held in contact with the brake rotor.

According to this second construction, since the electrocorrosion preventive coating is provided on the surface of the wheel mounting flange that is held in contact with the brake rotor, the battery circuit will hardly be formed between the flange and the brake rotor even when the contact surface is wetted with muddy salt water, thereby preventing the electrode corrosion. Because of this, sticking of the brake rotor to the wheel mounting flange due to the electrode corrosion does not occur, and removal of the brake rotor during the repair and inspection will not be hampered. Also, because of the provision of the electrocorrosion preventive coating, unlike the case in which a separate insulating member is intervened between the flange and the brake rotor, there is no increase of the number of component parts used and complication of the control of the component parts and reduction in assemblability can be avoided.

Although various components can be employed for the electrocorrosion preventive coating in the rolling bearing according to the second construction, the hexavalent chrome-free chromate is preferred for the coating. As described above, the use of the hexavalent chrome-free chromate is effective to render the coating to be harmless to the environment. According to the test, it has been confirmed that even though the hexavalent chrome-free chromate is used for the coating, proper selection of, for example, a plated layer for backing preparation can render the coating to be more excellent in electrocorrosion prevention than an electrocorrosion preventive coating utilizing the hexavalent chrome containing chromate.

In the first and second constructions, the electrocorrosion preventive coating may be designed to include a first plated layer provided on the surface of the base metal and a chromate layer of hexavalent chrome-free chromate overlaid on an outer surface of the first plated layer. For the first plated layer, a zinc-nickel plating or the like can be employed.

The chromate layer of hexavalent chrome-free chromate will, when applied to overlap the plated layer formed on the base metal, become excellent in suppressing the electrocorrosion.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

BEST MODE FOR CARRYING OUT THE INVENTION

A first preferred embodiment of the present invention will be described with particular reference to FIGS. 1 to 3. This first embodiment is directed to a wheel support bearing. This wheel support bearing is of an inner race rotating type and a third generation model designed to support a vehicle drive wheel.

Figure 1:
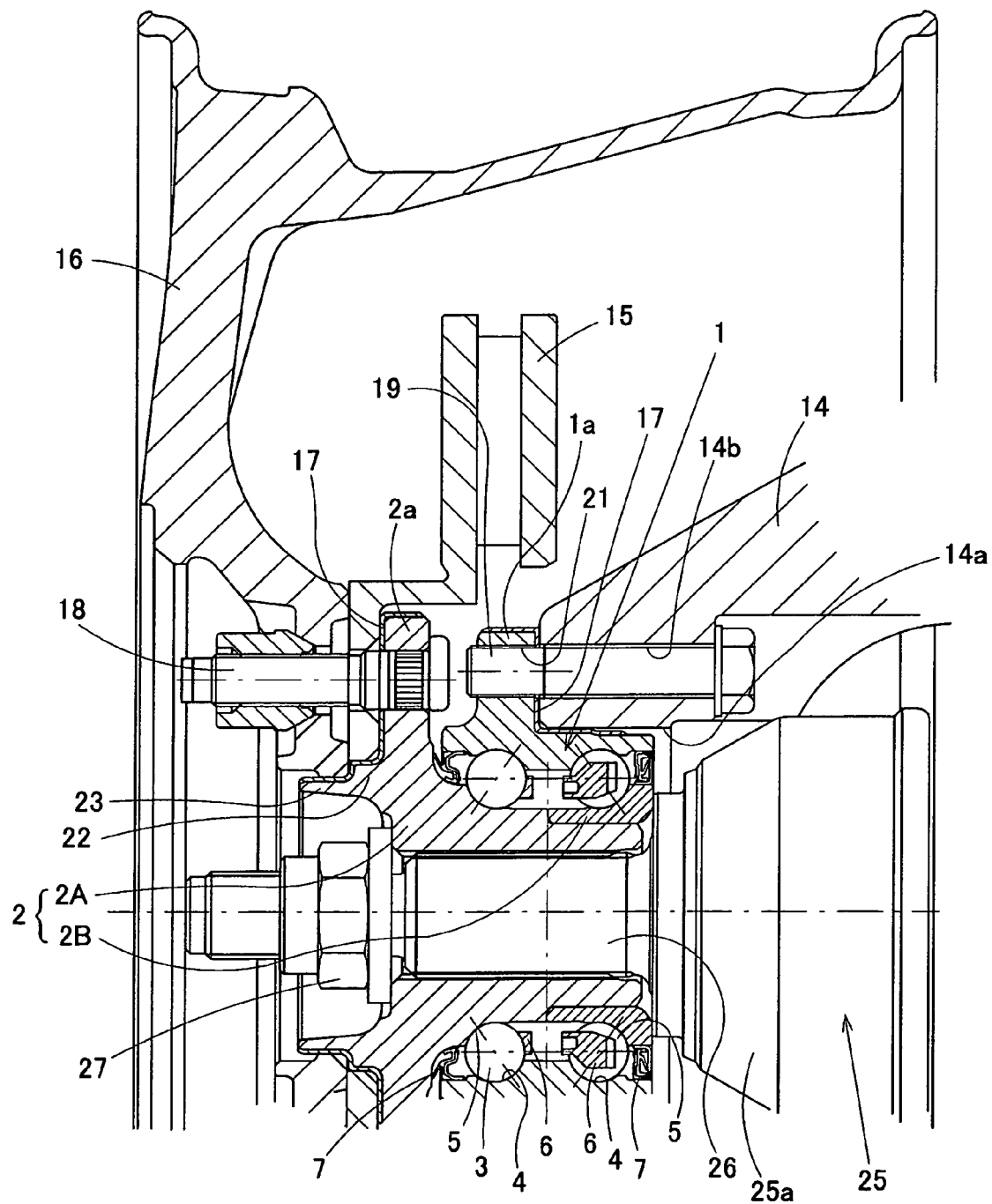
FIG. 1 is a sectional view showing a wheel support structure, in which a vehicle wheel is supported by a wheel support bearing according to a first preferred embodiment of the present invention.

As shown in FIG. 1, the wheel support bearing according to the first embodiment includes an outer member 1 having an inner peripheral surface formed with raceway surfaces 4 of double rows, an inner member 2 having an outer peripheral surface formed with raceway surfaces 5 opposed respectively to the raceway surfaces 4, and double rows of rolling elements 3 interposed respectively between the raceway surfaces 4 and the raceway surfaces 5. The rolling elements 3 are employed in the form of a ball and are retained in each row by a respective retainer 6. The raceway surfaces 4 and 5 are of an arcuate sectional shape, with contact angles so defined as to be held in back-to-back relation with each other. This wheel support bearing represents a dual row angular contact ball bearing. An annular space delimited between the inner and outer members 2 and 1 have outboard and inboard open ends sealed by respective sealing members 7 and 8. The terms "inboard" and "outboard" represent the sides facing the inside and outside of the vehicle, respectively.

The outer member 1 serves as a stationary member and includes a vehicle body fitting flange 1a positioned on an axially outboard end of an outer peripheral surface of the outer member 1 and used to connect the outer member 1 to a knuckle 14, which is a member that contacts the outer member 1. The vehicle body fitting flange 1a has a plurality of fitting holes 21 defined therein in the circumferential direction. The fitting hole 21 is in the form of an internally threaded hole.

The inner member 2 serves as a rotatable member and is made up of a hub axle 2A, having a wheel mounting flange 2a, and a separate inner race 2B mounted externally on an inboard end of the hub axle 2A. The hub axle 2A and the inner race 2B are formed with the respective raceway surfaces 5 for the associated rows. The wheel mounting flange 2a is formed on an outboard end of the inner member 2. A brake pilot portion 22 and a wheel pilot portion 23 are so formed in the outboard end of the inner member 2 as to protrude in an outboard direction of the inner member 2 beyond the wheel mounting flange 2a. A rim of a vehicle wheel 16 is fitted to the wheel mounting flange 2a through a brake rotor 15 by means of bolts 18. The brake pilot portion 22 and the wheel pilot portion 23 position brake rotor 15 and the vehicle wheel 16, respectively, which are members that contact the inner member 2, by receiving the brake rotor 15 and an inner peripheral surface of the rim of the vehicle wheel 16. The brake rotor 15 is a brake disc used in a disc brake and made of an aluminum alloy.

The hub axle 2A has an inner bore, into which an axle portion 26 of an outer coupling member 25a of a constant velocity universal joint 25 in a drive axle is inserted. The axle portion 26 has a free end that is externally threaded and is rigidly fastened to the hub axle 2A by means of a nut 27.

The knuckle 14 is a member fitted to a vehicle body structure (not shown) and defines a bearing housing for the wheel support bearing. This knuckle 14 has a bearing mounting hole 14a defined therein, and bolt insertion holes 14b are defined in the knuckle 14 along the bearing mounting hole 14a. The outer member 1 is fitted to the knuckle 14 by means of bolts 19 (FIG. 1) with a portion of an outer peripheral surface of the outer member 1 engaged in the bearing fitting hole 14a on the inboard side of the vehicle body fitting flange 1a and also with the vehicle body fitting flange 1a held in abutment with a side face of the knuckle 14. The bolts 19 are passed through the corresponding bolt insertion holes 14b of the knuckle 14 with threaded shank portions threadingly engaged with the fitting holes 21 in the vehicle body fitting flange 1a.

The knuckle 14 is made of an aluminum alloy. The outer member 1, the inner member 2 and the rolling elements 3 of the wheel support bearing are all made of a steel material, for example, carbon steel or high-carbon chrome steel.

Figure 2:
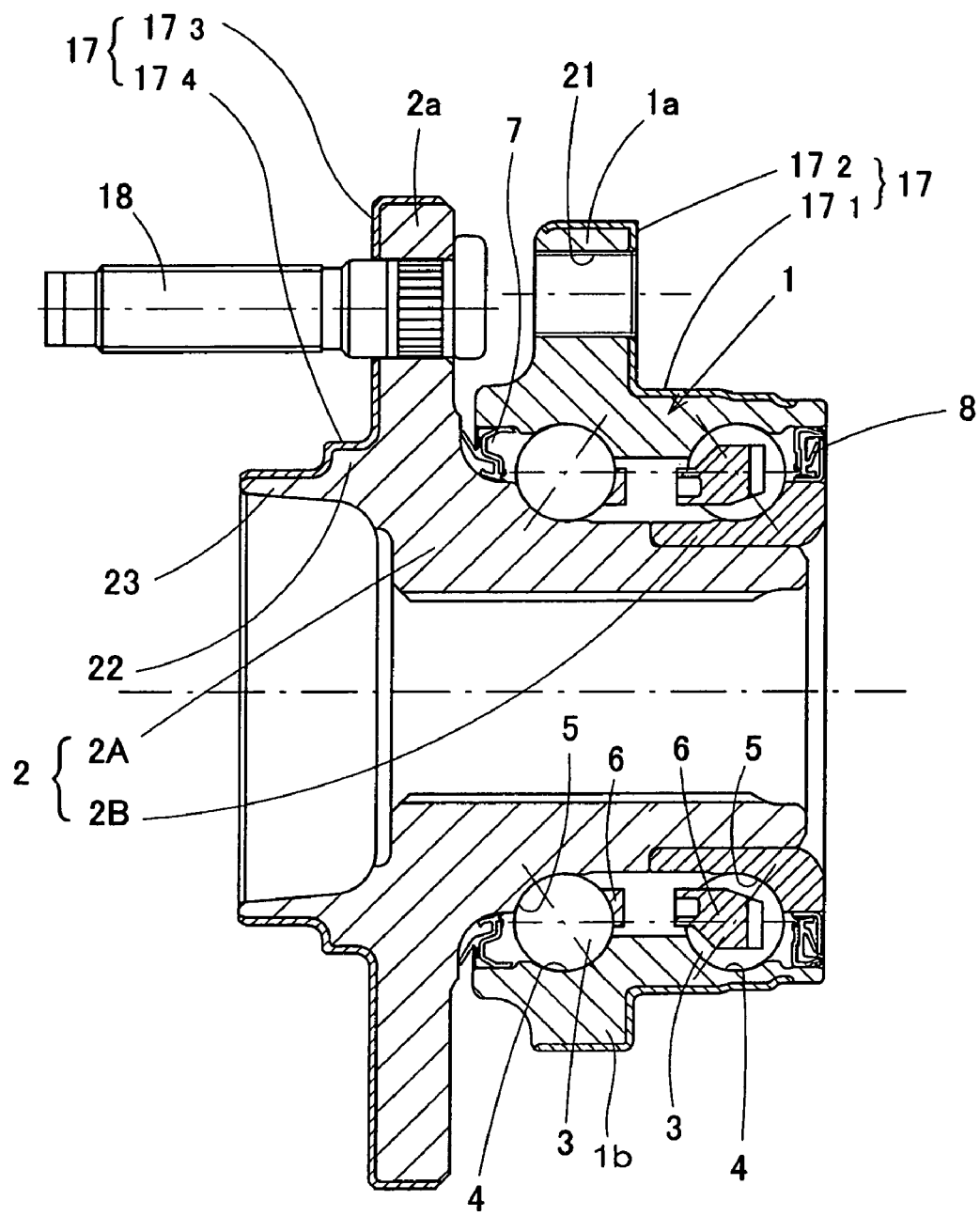
FIG. 2 is a sectional view of the wheel support bearing.

As shown in FIG. 2, the surface of the outer member 1 that is held in contact with the knuckle 14 is provided with an electrocorrosion preventive coating 17. This electrocorrosion preventive coating 17 continuously covers that portion of the outer peripheral surface of the outer member 1, which is engaged in the bearing fitting hole 14a of the knuckle 14, one side surface of the vehicle body fitting flange 1a held in abutment with the side face of the knuckle, and the outer peripheral surface of the flange 1a. In other words, the electrocorrosion preventive coating 17 includes an outer peripheral surface covering portion $17_1$ formed on the outer peripheral surface of the outer member 1 and a flange covering portion $17_2$ formed on one side surface and an outer peripheral surface of the flange 1a. The electrocorrosion preventive coating 17 may be additionally formed on an outer peripheral surface of a projecting portion 1b of the outer member 1.

Also, an outboard side surface and an outer peripheral surface of the wheel mounting flange 2a and the pilot portions 22 and 23 are provided with the electrocorrosion preventive coating 17. The electrocorrosion preventive coating 17 also includes a covering portion $17_3$, which covers the outboard side surface and the outer peripheral surface of the wheel mounting flange 2a that is held in abutment the brake rotor 15, and a pilot-portion covering portion $17_4$ which covers the pilot portions 22 and 23.

Figure 3A:
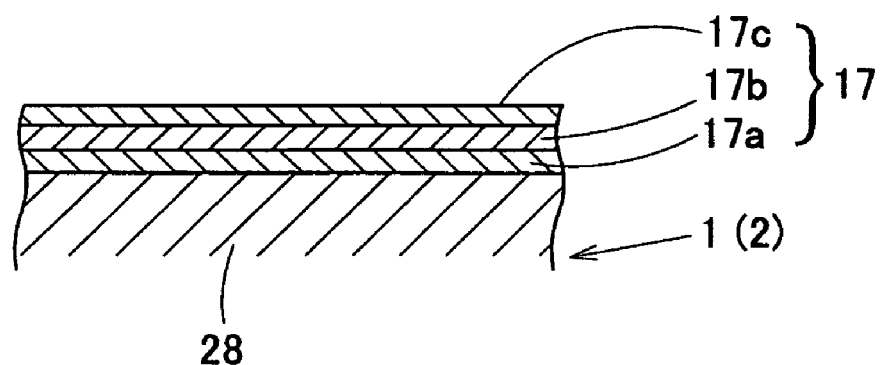
FIGS. 3A and 3B are fragmentary enlarged sectional views showing different examples of electrocorrosion preventive coatings used in the wheel support bearing.

The electrocorrosion preventive coating 17 contains hexavalent chrome-free chromate. This electrocorrosion preventive coating 17 is of a three layered structure including, as shown in FIG. 3A, a first plated layer 17a provided on a surface of a matrix 28 of, for example, the outer member 1, a chromate layer 17b of hexavalent chrome-free chromate provided on an outer surface of the plated layer 17a in overlapping relation with the first plated layer 17a, and a resin layer 17c of a resin system provided on an outer surface of the chromate layer 17b in overlapping relation with the chromate layer 17b. For the resin layer 17c, a low-temperature heat curable coating material is used. The low-temperature heat curable coating material includes, for example, a one-component, low-temperature heat curable coating material.

Figure 3B:
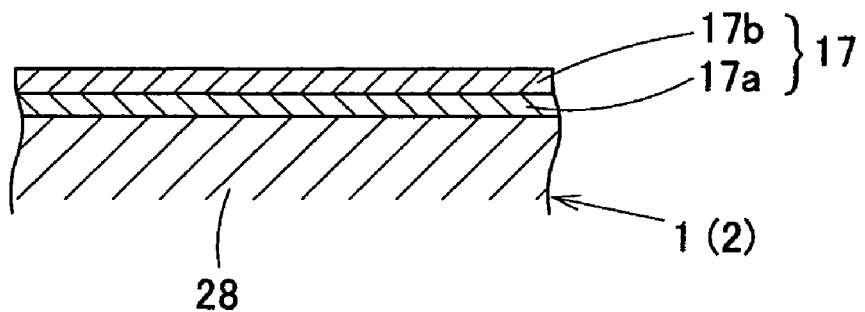

Alternatively, the electrocorrosion preventive coating 17 may be of a double layered structure including, as shown in FIG. 3B, a first plated layer 17a and a chromate layer 17b of hexavalent chrome-free chromate.

Specific examples of the electrocorrosion preventive coating 17 are enumerated below. The legend in parentheses represents the type of material used to form the respective layer.

(Zn—Ni plating)+(Hexavalent chrome-free chromate)+(Low-temperature heat curable coating)
(Zn—Ni plating)+(Hexavalent chrome-free chromate)
(Zn plating)+(Hexavalent chrome-free chromate)+(Low-temperature heat curable coating)
(Zn plating)+(Hexavalent chrome-free chromate)
(Zn—Ni—Fe plating)+(Hexavalent chrome-free chromate)+(Low-temperature heat curable coating)
(Zn—Ni—Fe plating)+(Hexavalent chrome-free chromate)
(Cadmium plating)+(Hexavalent chrome-free chromate)+(Low-temperature heat curable coating)
(Cadmium plating)+(Hexavalent chrome-free chromate)

As a principal component of the hexavalent chrome-free chromate, the following two compounds can be enumerated.

Chromium nitrate+Inorganic salt
Chromium sulfate+Inorganic salt

For the inorganic salt, any of nitrate, hydrosulfate and hydrochloride can be employed.

It is to be noted that the principal component of the standard chromate is chromic anhydride (or dichromic acid)+inorganic salt (nitric acid, sulfuric acid, hydrochloric acid). The chromic anhydride (or dichromic acid) contains hexavalent chrome.

In contrast to the standard hexavalent chrome containing chromate, the hexavalent chrome-free chromate contains chromium sulfate or chromium nitrate free of hexavalent chrome, that is used in place of the chromic anhydride (or dichromic acid).

According to the wheel support bearing of the structure described above, since the outer member 1 is made of steel and the knuckle 14 is made of an aluminum alloy, the outer member 1 and the knuckle 14 have a metal-to-metal relation to develop a potential difference therebetween. However, since the respective contact surfaces of the outer member 1 with the knuckle 14 are covered with the electrocorrosion preventive coating 17, there is no possibility of the battery circuit established even though those contact surfaces are exposed to muddy salt water. Accordingly, it is possible to avoid the contact surfaces from suffering from electrode corrosion and difficulty in removing the wheel support bearing from the knuckle 14 during the repair of the automotive vehicle can be eliminated. Also, since the electrocorrosion preventive coating 17 is employed, unlike the case in which a separate insulating member is intervened between the outer member 1 and the knuckle 14, there is no increase of the number of component parts used and complication of the control of the component parts used and reduction in assemblability can also be avoided. Since the hexavalent chrome-free chromate is used in the electrocorrosion preventive coating 17, the coating 17 can be rendered to be non-hazardous. Also, according to a series of experiments conducted, it has been confirmed that even though the hexavalent chrome-free chromate is used, proper selection of materials for the three layers 17a to 17c can render the coating 17 to be more excellent in electrocorrosion prevention than an electrocorrosion preventive coating utilizing the hexavalent chrome containing chromate.

Also, according to the wheel support bearing of the structure described above, since the hub axle 2A is made of steel and the brake rotor 15 is made of an aluminum alloy, the hub axle 2A and the brake rotor 15 have a metal-to-metal relation to develop a potential difference therebetween. However, since the electrocorrosion preventive coatings 17 also covers the wheel mounting flange 2a and the pilot portions 22 and 23 of the hub axle 2A, there is no possibility of the battery circuit established even though the contact surfaces of the flange 2a and the pilot portions 22 and 23 with the brake rotor 15 and the rim of the wheel 16 are exposed to muddy salt water and, thus, the electrocorrosion in those contact surfaces can be avoided. Rusting can also be avoided in the presence of the electrocorrosion preventive coatings 17. Therefore, sticking between the brake rotor 15 and the hub axle 2A can be prevented and difficulty in removing the brake rotor 15 during the repair of the automotive vehicle can be eliminated. In addition, since the electrocorrosion preventive coating 17 is employed, unlike the case in which a separate insulating member is intervened between the brake rotor 15 and the hub axle 2A, there is no increase of the number of component parts used and complication of the control of the component parts used and reduction in assemblability can also be avoided.

Since the hexavalent chrome-free chromate is used for the electrocorrosion preventive coating 17 formed on the wheel mounting flange 2a and the pilot portions 22 and 23 of the hub axle 2A, the coating 17 can be rendered to be non-hazardous. Even in this case, a series of experiments conducted have confirmed that even though the hexavalent chrome-free chromate is used, proper selection of materials for the three layers 17a to 17c can render the coating 17 to be more excellent in electrocorrosion prevention than an electrocorrosion preventive coating utilizing the hexavalent chrome containing chromate.

Figure 4:
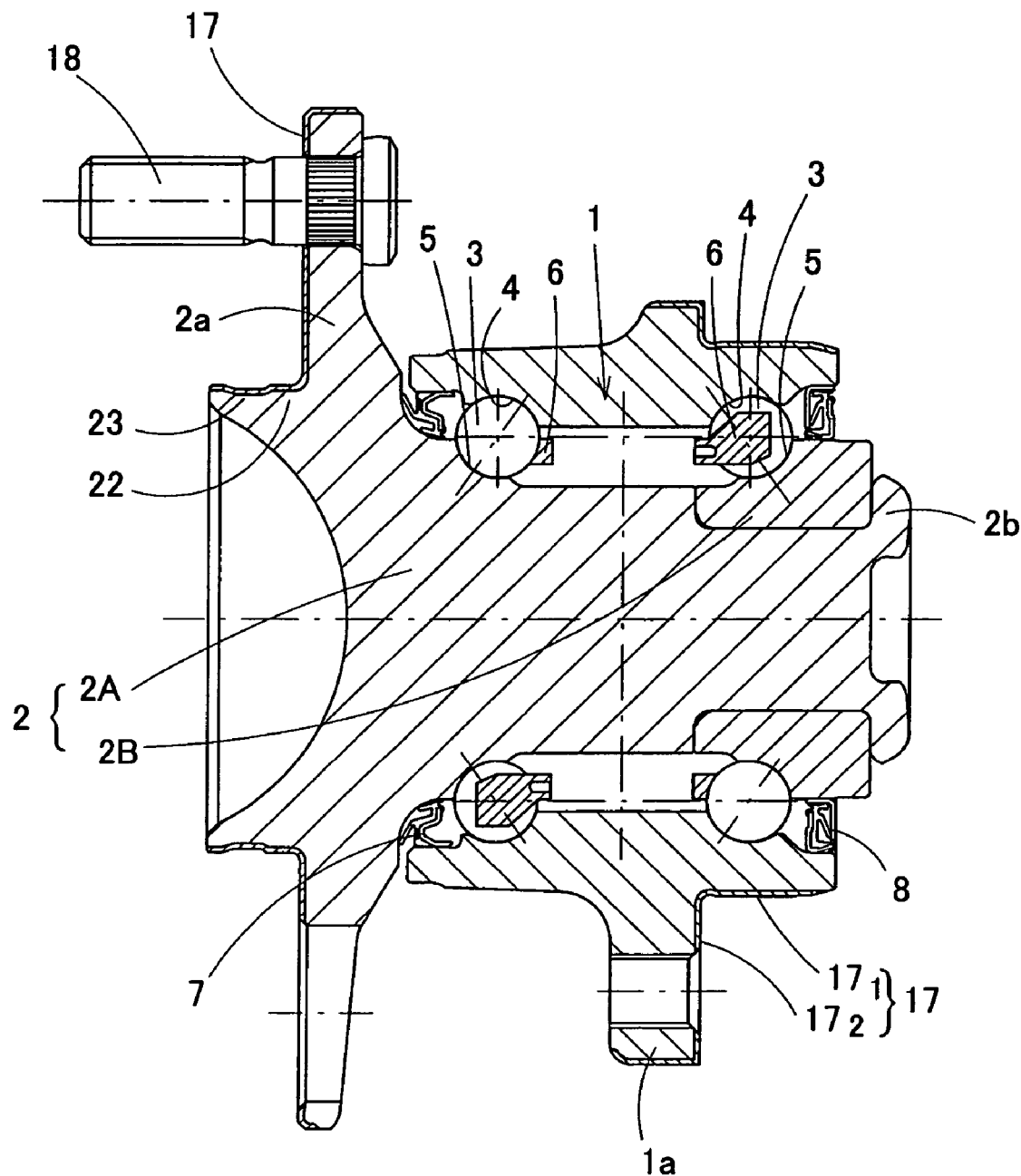
FIG. 4 is a sectional view showing a wheel support bearing according to a second preferred embodiment of the present invention.

FIG. 4 illustrates a second preferred embodiment of the present invention. This second embodiment is similar to the wheel support bearing according to the first embodiment shown in FIGS. 1 to 3, but differs therefrom in that it is designed to support a vehicle driven wheel. Because of the design to support the vehicle driven wheel, the hub axle 2A has no inner bore defined in a center thereof. The inner race 2B is mounted on the hub axle 2A by a staked portion 2b provided in the hub axle 2A. Even in this example, the electrocorrosion preventive coating 17 is applied not only to the surface of the outer member 1, which contacts the knuckle 14 (See FIG. 1.), but also to the surface of the wheel mounting flange 2a, which contacts the brake rotor 15, and respective surfaces of the pilot portions 22 and 23. The material and the overlapping layered-structure of the electrocorrosion preventive layer 17, which have been shown and described in connection with the first embodiment, can be employed. Other structural features of this embodiment are similar to those in the first embodiment and, therefore, the details thereof are not reiterated, but like parts are designated by like reference numerals. It is to be noted that in this second embodiment, the wheel mounting flange 1a is provided on the outer peripheral surface of the outer member 1 at an axially intermediate position of the outer member 1.

Figure 5:
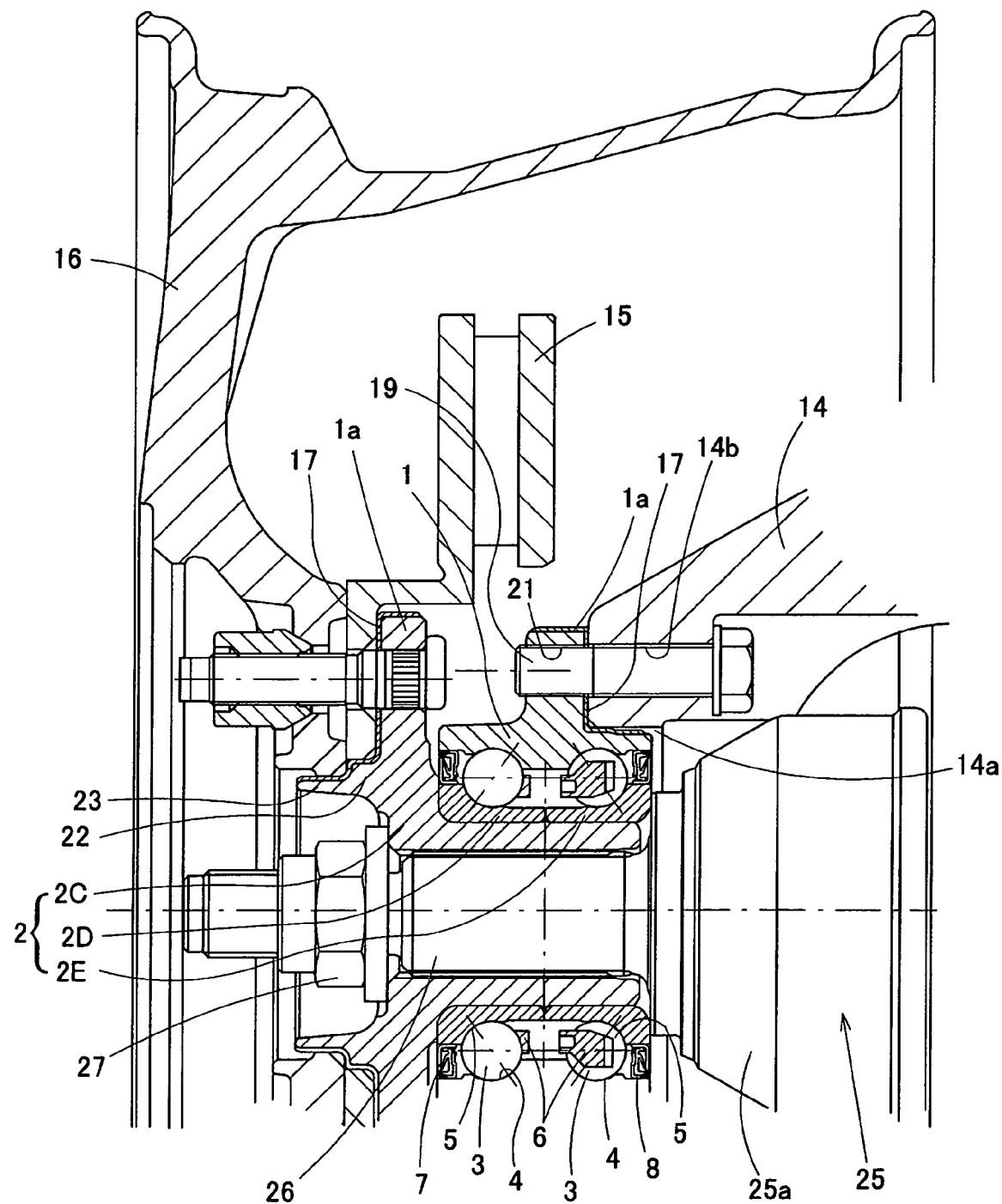
FIG. 5 is a sectional view showing a wheel support structure, in which a vehicle wheel is supported by a wheel support bearing according to a third preferred embodiment of the present invention.

FIG. 5 illustrates a third preferred embodiment of the present invention. This third embodiment is similar to the wheel support bearing of the first embodiment shown in FIGS. 1 to 3 and is directed to a second generation type although equally used to support the vehicle drive wheel. In this third embodiment, the inner member 2 is made up of a hub axle 2C and two inner races 2D and 2E externally mounted on the hub axle 2C, and the raceway surfaces 5 for the respective rows are formed in those inner races 2D and 2E.

The outer member 1 is of one-piece construction as is the case with the first embodiment and has the vehicle body fitting flange 1a.

Even in this example, the electrocorrosion preventive coating 17 is applied not only to the surface of the outer member 1, which contacts the knuckle 14, but also to the surface of the wheel mounting flange 2a of the hub axle 2C, which contacts the brake rotor 15, and respective surfaces of the pilot portions 22 and 23. The material and the overlapping layered-structure of the electrocorrosion preventive layer 17, which have been shown and described in connection with the first embodiment, can be employed. Other structural features of this third embodiment are similar to those in the first embodiment and, therefore, the details thereof are not reiterated, but like parts are designated by like reference numerals. It is to be noted that in this third embodiment, the wheel mounting flange 1a is provided on the outer peripheral surface of the outer member 1 at an axially intermediate position of the outer member 1. Also, although in the first to third embodiments shown in FIGS. 1 to 5, the rolling elements 3 have been shown in the form of a ball, they may be a tapered roller.

Figure 6:
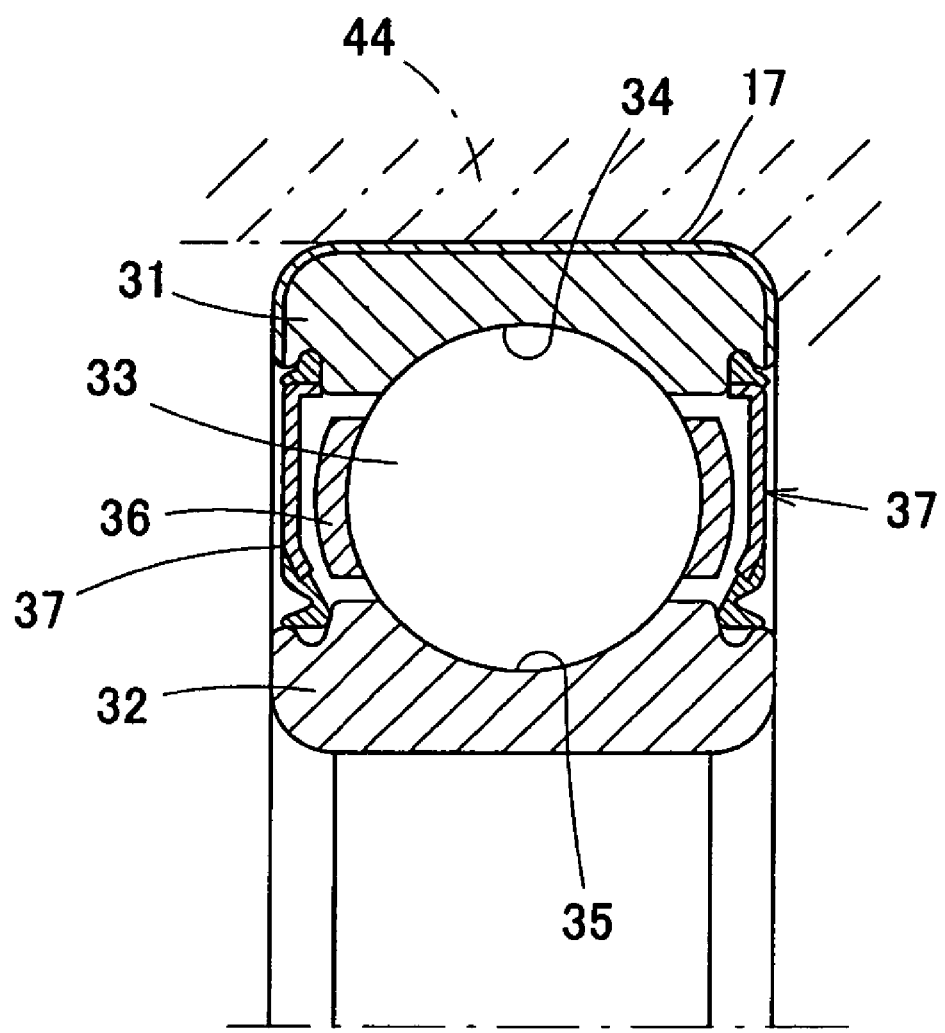
FIG. 6 is a fragmentary sectional view showing a rolling bearing according to a fourth preferred embodiment of the present invention.

FIG. 6 illustrates a fourth preferred embodiment of the present invention. This fourth embodiment is applied to a deep groove ball bearing. This rolling bearing includes an outer race 31, an inner race 32 and a row of rolling elements 33, each in the form of a ball, which are interposed between respective raceway surfaces 34 and 35 defined in the outer and inner races 31 and 32. The rolling elements 33 are retained by a retainer 36. A bearing space delimited between the outer and inner races 31 and 32 have opposite open ends sealed by respective sealing members 37 and 37 secured to the outer race 31. The outer race 31, the inner race 32 and the rolling elements 33 are made of steel.

This rolling bearing is of a design, in which an outer peripheral surface of the outer race 31 is inserted in and fitted to an inner peripheral surface of a housing 44 made of an aluminum alloy. A surface of the outer race 31, which is held in contact with the housing 44, is provided with an electrocorrosion preventive coating 17 containing the hexavalent chrome-free chromate. The electrocorrosion preventive coating 17 may be provided on not only an outer peripheral surface of the outer race 31 but also opposite end faces of the outer race 31. The material and the overlapping layered-structure of the electrocorrosion preventive layer 17, which has been shown and described in connection with the first embodiment, can be employed.

Even with this deep groove ball bearing, a problem associated with the electric corrosion occurs in the event that the bearing is used under the environment in which the bearing is installed inside the housing 44 of the aluminum alloy and the surface of the outer race 31 held in contact with the housing 44 is exposed to muddy salt water. This problem can be eliminated with the electrocorrosion preventive coating 17. Since the electrocorrosion preventive coating 17 utilizes the hexavalent chrome-free chromate as is the case with that in any one of the previously described embodiments, it can be rendered to be non-hazardous and to be excellent in prevention of the electric corrosion.

Figure 7:
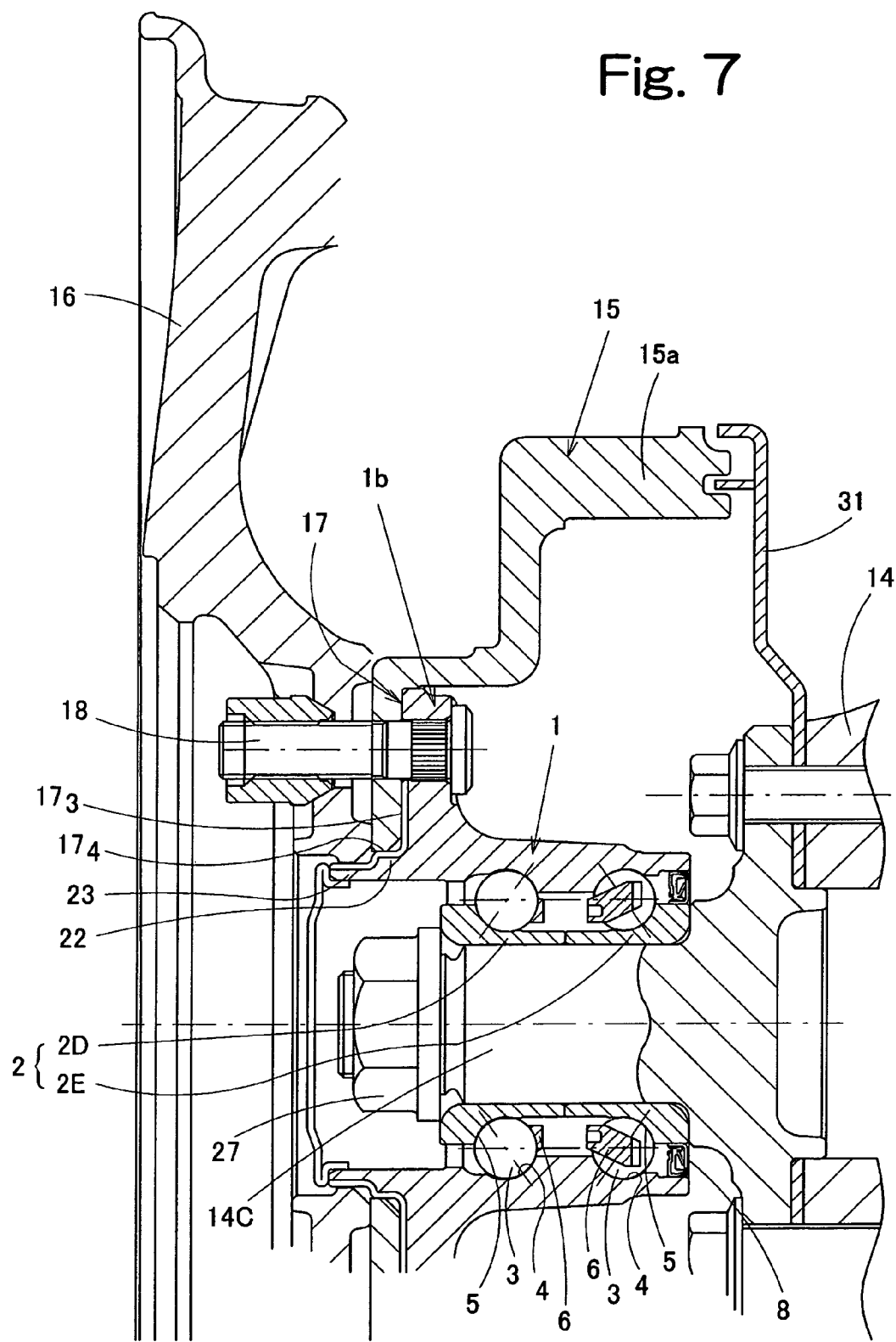
FIG. 7 is a sectional view showing a wheel support bearing according to a fifth preferred embodiment of the present invention, together with peripheral component parts.

FIG. 7 illustrates a fifth preferred embodiment of the present invention. This fifth embodiment is directed to a bearing equipped with a wheel support bearing of an outer race rotating type. In FIG. 7, components functionally similar to those in the first embodiment are designated by like reference numerals, regardless of whether they are provided on the outer member 1 or whether they are provided on the inner member 2.

In this fifth embodiment, of the outer member 1 having the raceway surfaces 4 and the inner member 2 having the raceway surfaces 5, the inner member 2 serves as a stationary member. The inner member 2 is made up of two inner races 2D and 2E and is mounted on an outer periphery of an axle portion 14c, provided in the knuckle 14, and is fixed thereto by means of a nut 27. The outer member 1 has a wheel mounting flange 1b formed in the vicinity of an outboard end thereof and is provided with a brake pilot portion 22 and a wheel pilot portion 23 that axially extend from the outboard end of the outer member 1 beyond the wheel mounting flange 1b. A rim of a vehicle wheel 16 is fitted to this wheel mounting flange 1b through a brake rotor 15 by means of bolts 18. The brake rotor 15 is, in the illustrated instance, a brake drum of a drum brake and made of an aluminum alloy. A dust preventive plate 31 is fitted to the knuckle 14 so as to confront an inboard end of a cylindrical portion 15a of the brake rotor 15 and a labyrinth seal is formed between the inboard end of the cylindrical portion 15a and the dust preventive plate 31.

An outboard side surface of the wheel mounting flange 1b and the pilot portions 22 and 23 in the outer member 1 are provided with an electrocorrosion preventive coating 17. The electrocorrosion preventive coating 17 includes a covering portion $17_3$, which covers the outboard side surface of the wheel mounting flange 1b in contact with the brake rotor 15, and a pilot-portion covering portion $17_4$ which covers the pilot portions 22 and 23. As is the case with the first embodiment, the electrocorrosion preventive coating 17 is of the double or three layered structure utilizing the hexavalent chrome-free chromate.

Figure 8:
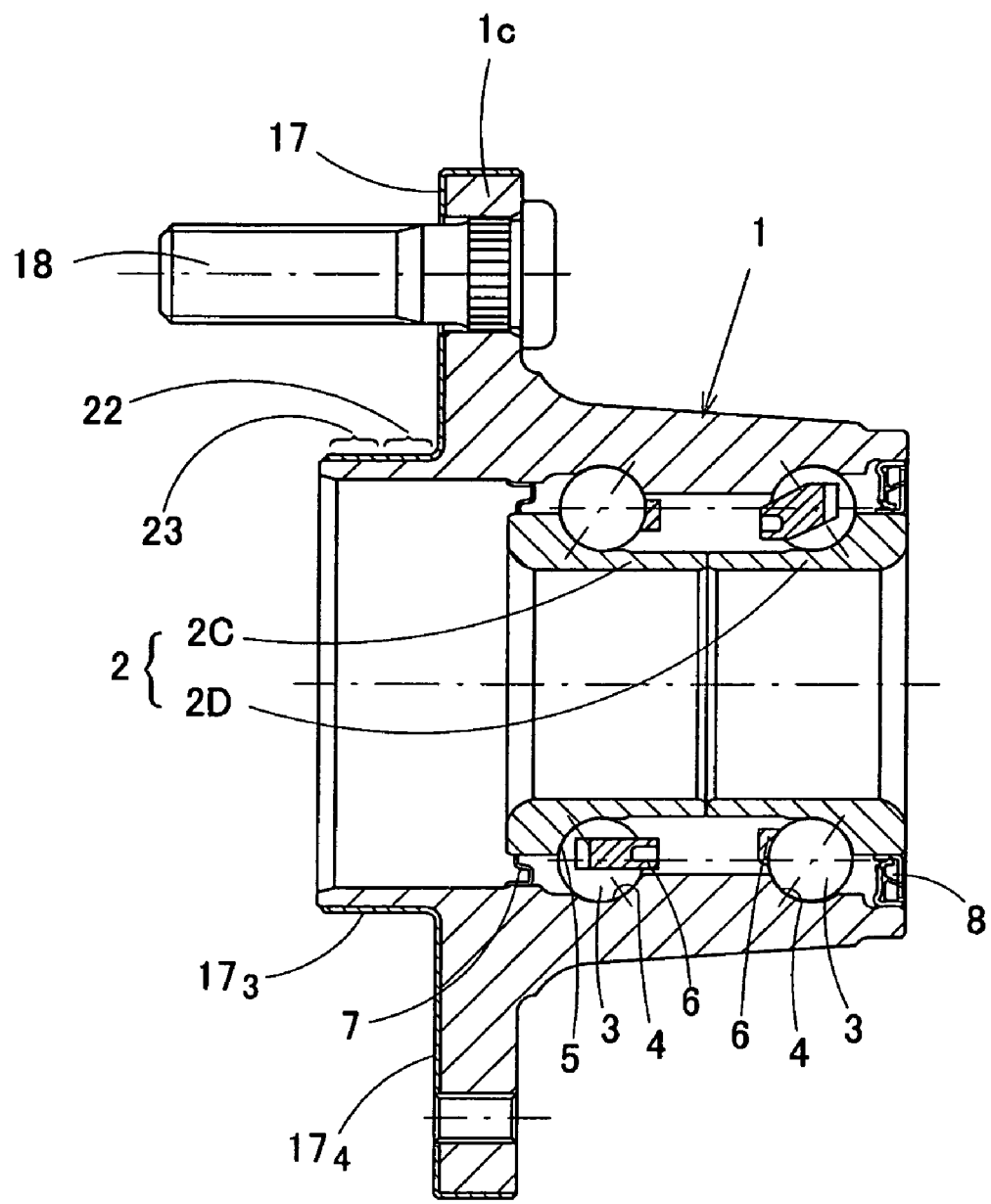
FIG. 8 illustrates a wheel support bearing according to a sixth preferred embodiment of the present invention.

It is to be noted that although in the fifth embodiment, the brake pilot portion 22 has been shown as having a diameter greater than that of the wheel pilot portion 23, the brake pilot portion 22 may have the same diameter as that of the wheel pilot portion 23 as shown in, for example, FIG. 8 in connection with a sixth preferred embodiment. In other words, the outer member 1 may have a cylindrical portion of an uniform outer diameter that axially extends from the outboard end of the outer member 1, with a base portion of the cylindrical portion serving as the brake pilot portion 22 while a free end thereof serving as the wheel pilot portion 23.

Even in the wheel support bearings of the inner race rotating type shown in FIGS. 1 to 5, the brake pilot portion 22 may have the same diameter as that of the wheel pilot portion 23 as is the case with the sixth embodiment shown in FIG. 8.

Even in the wheel support bearings of the inner race rotating type shown in FIGS. 1 to 5, the brake rotor 15 may be a brake drum of the drum brake as is the case with the fifth embodiment shown in FIG. 7. Conversely, the brake rotor 15 in the fourth embodiment shown in FIG. 6 may be a brake disc of the disc brake.

It is to be noted that although in any one of the previously described embodiments, the electrocorrosion preventive coating 17 has been described as containing the hexavalent chrome-free chromate, the electrocorrosion preventive coating 17 may be, for example, a painted film of a baking type water-soluble paint or a powder-coated film. For the powder-coated film, any of various resins, for example, polyester, epoxy resin and acrylic resin can be employed. Although different from the present invention, as an antirust treatment, a gasket may be interposed between the wheel mounting flange 2a or 1b and the brake rotor 15. Silicon and graphite, for example, can be enumerated as a coating of the gasket.

Also, although in any one of the previously described embodiments, the present invention has been described as applied to the wheel support bearing of a ball bearing type, the present invention can be equally applied to the wheel support bearing of a tapered roller bearing type.

Hereinafter, a test conducted and the result of the test will be described. Samples in which the electrocorrosion protective coating 17 was applied to the outer member 1 of the wheel support bearing were sprayed with salt water, and the appearance of the samples was observed by the time 960 hours passed subsequent to the spraying.

The test condition is a salt water spraying test based on JIS Z2371, in which the concentration of the salt water was 5 w % and the ambient temperature was 35° C.

Test samples for the test included an inventive example, in which the electrocorrosion preventive coating 17 formed on the outer member 1 of the wheel support bearing according to the second embodiment shown in FIG. 4 was prepared from (Zn—Ni plating)+(Hexavalent chrome-free chromate)+(Low-temperature heat curable coating) and a comparative example, in which the electrocorrosion preventive coating formed on the outer member 1 of the wheel support bearing according to the second embodiment was prepared from (Zn—Ni plating)+(Hexavalent chrome containing chromate)+(Low-temperature heat curable coating).

Results of the tests are tabulated in Table 1 together with a scoring method.

TABLE 1

Test Results

Scoring:

| | |
|---|---|
| 10: | No abnormality |
| 9: | White rust occurring in a surface area of not larger than 5%. |
| 8: | White rust occurring in a surface area of 5 to 20%. |
| 7: | White rust occurring in a surface area of 20 to 50%. |
| 6: | White rust occurring in a surface area of 50 to 80% |
| 5: | White rust (not smaller than 80%) in the entire surface and Red rust in a surface area of 0 to 5% of red rust |
| 4: | Red rust occurring in a surface area of 5 to 20%. |
| 3: | Red rust occurring in a surface area of 20 to 50%. |
| 2: | Red rust occurring in a surface area of 50 to 80%. |
| 1: | Red rust occurring in the entire surface area (not smaller than 80%). |

1) Inventive Example

Zn—Ni plating+hexavalent chrome-free chromate+Low-temp. heat curable coating

| Test Time (H) | Results | Comments |
|---|---|---|
| 0 | — | — |
| 24 | 10 | White discoloration occurring in the entire surface |
| 96 | 9 | Slight white rust |
| 240 | 9 | Slight white rust |
| 480 | 8 | Conspicuous white rust together with black discoloration |
| 960 | 7 | White rust occurring around screw holes and conspicuous black discoloration |

2) Comparative Example

Zn—Ni plating+hexavalent chrome containing chromate+Low-temp. heat curable coating

| Test Time (H) | Results | Comments |
|---|---|---|
| 0 | — | — |
| 24 | 10 | Somewhat white discoloration |
| 96 | 10 | Somewhat white discoloration |
| 240 | 7 | White discoloration in the entire surface accompanied by white rust |
| 480 | 6 to 5 | White discoloration in the entire surface accompanied by white rust |
| 960 | 5 | White discoloration in the entire surface accompanied by white rust |

Table 1 above makes it clear that by the time 240 hours passed subsequent to the salt water spraying, the comparative example, in which the hexavalent chrome containing chromate was used, was found to be more excellent in rust prevention than the inventive example, but by the time 480 hours passed and even at the time 960 hours passed, the inventive example, in which the hexavalent chrome-free chromate was used, was found to be more excellent in rust prevention than the comparative example.

In view of the foregoing, considering the actual use, the inventive example, in which the hexavalent chrome-free chromate is used, appears to be more excellent in electrocorrosion prevention than the comparative example. It is to be noted that similar test results were obtained even with other coatings which have been enumerated as a specific example of the electrocorrosion preventive coating 17 provided on the outer member 1, but the details thereof are not discussed here.

Also, a different test conducted and the results of the test will be described. Samples in which the electrocorrosion protective coating 17 was applied to the inner member 2 of the wheel support bearing were sprayed with salt water and the appearance of the samples was observed by the time 960 hours passed subsequent to the spraying.

The test condition is a salt water spraying test based on JIS Z2371, in which the concentration of the salt water was 5 w % and the ambient temperature was 35° C.

Test samples for the test included an inventive example, in which the electrocorrosion preventive coating 17 formed on the inner member 2 of the wheel support bearing according to the second embodiment shown in FIG. 4 was prepared from (Zn-Ni plating)+(Hexavalent chrome-free chromate)+(Low-temperature heat curable coating) and a comparative example, in which the electrocorrosion preventive coating formed on the inner member 2 of the wheel support bearing according to the second embodiment was prepared from (Zn—Ni plating)+(Hexavalent chrome containing chromate)+(Low-temperature heat curable coating).

Results of the tests are tabulated in Table 2 together with a scoring method.

TABLE 2

Test Results

Scoring:

| | |
|---|---|
| 10: | No abnormality |
| 9: | White rust occurring in a surface area of not larger than 5%. |
| 8: | White rust occurring in a surface area of 5 to 20%. |
| 7: | White rust occurring in a surface area of 20 to 50%. |
| 6: | White rust occurring in a surface area of 50 to 80% |

TABLE 2-continued

Test Results

Scoring:

5: White rust (not smaller than 80%) in the entire surface and Red rust in a surface area of 0 to 5%
4: Red rust occurring in a surface area of 5 to 20%.
3: Red rust occurring in a surface area of 20 to 50%.
2: Red rust occurring in a surface area of 50 to 80%.
1: Red rust occurring in the entire surface area (not smaller than 80%).

1) Inventive Example

Zn—Ni plating+hexavalent chrome-free chromate+Low-temp. heat curable coating

| Test Time (H) | Results | Comments |
| --- | --- | --- |
| 0 | — | — |
| 24 | 10 | White discoloration occurring in the entire surface |
| 96 | 9 | Slight white rust |
| 240 | 9 | Slight white rust |
| 480 | 8 | Conspicuous white rust together with black discoloration |
| 960 | 7 | White rust occurring around screw holes and conspicuous black discoloration |

2 Comparative Example

Zn—Ni plating+hexavalent chrome containing chromate+Low-temp. heat curable coating

| Test Time (H) | Results | Comments |
| --- | --- | --- |
| 0 | — | — |
| 24 | 10 | Somewhat white discoloration |
| 96 | 10 | Somewhat white discoloration |
| 240 | 7 | White discoloration in the entire surface accompanied by white rust |
| 480 | 6 to 5 | White discoloration in the entire surface accompanied by white rust |
| 960 | 5 | White discoloration in the entire surface accompanied by white rust |

Table 2 above makes it clear that by the time 240 hours passed subsequent to the salt water spraying, the comparative example, in which the hexavalent chrome containing chromate was used, was found to be more excellent in rust prevention than the inventive example, but by the time 480 hours passed and even at the time 960 hours passed, the inventive example, in which the hexavalent chrome-free chromate was used, was found to be more excellent in rust prevention than the comparative example.

In view of the foregoing, considering the actual use, the inventive example appears to be more excellent in electrocorrosion prevention than the comparative example. It is to be noted that similar test results were obtained even with other coatings which have been enumerated as a specific example of the electrocorrosion preventive coating 17 provided on the inner member 2, but the details thereof are not discussed here.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

What is claimed is:

1. A rolling bearing for rotatably supporting a vehicle wheel relative to a vehicle body structure, comprising:
an outer member having an inner peripheral surface formed with raceway surfaces of double rows;
an inner member having an outer peripheral surface formed with raceway surfaces opposed to the raceway surfaces of the outer member; and
double rows of rolling elements interposed between the opposed raceway surfaces,
wherein at least one of the outer member and the inner member is a stationary member and the other is a rotational member, the stationary member contacting knuckle made of an aluminum alloy,
the stationary member has an outer peripheral surface formed with a vehicle body fitting flange for securement to the knuckle and the inner peripheral surface formed with the raceway surfaces for the rows,
the rotational member has one end formed with a wheel mounting flange and has the outer peripheral surface formed with the raceway surfaces opposed to the respective raceway surfaces of the outer member, with the rows of the rolling elements interposed between those opposed raceway surfaces,
a surface of the stationary member that contacts the knuckle and an outer peripheral surface of the vehicle body fitting flange are provided with an electrocorrosion preventive coating,
the electrocorrosion preventive coating further includes a zinc-nickel plated layer provided on the surface of a base metal forming the outer member or the inner member, a chromate layer of hexavalent chrome-free chromate overlaid on an outer surface of the zinc-nickel plated layer, and a resin layer of a resin system overlaid on an outer surface of the chromate layer.

2. A rolling bearing for a vehicle wheel for rotatably supporting the vehicle wheel relative to a vehicle body structure, comprising:
an outer member having an inner peripheral surface formed with raceway surfaces of double rows;
an inner member having an outer peripheral surface formed with raceway surfaces opposed to the raceway surfaces of the outer member; and
double rows of rolling elements interposed between the opposed raceway surfaces,
wherein one of the outer member and the inner member, which serves as a rotatable member, has a wheel mounting flange for supporting a rim of the vehicle wheel through a brake rotor made of an aluminum alloy, an electrocorrosion preventive coating being provided on a surface of the flange that is held in contact with the brake rotor and on an outer peripheral surface of the wheel mounting flange,
the electrocorrosion preventive coating contains hexavalent chrome-free chromate, and
the electrocorrosion preventive coating includes a zinc-nickel plated layer provided on the surface of a base metal forming the inner member or the outer member, and a chromate layer of hexavalent chrome-free chromate overlaid on an outer surface of the zinc-nickel plated layer, and a resin layer of a resin system overlaid on an outer surface of the chromate layer.

* * * * *

UNITED STATES PATENT AND TRADEMARK OFFICE
CERTIFICATE OF CORRECTION

| | |
|---|---|
| PATENT NO. | : 7,524,115 B2 |
| APPLICATION NO. | : 10/582854 |
| DATED | : April 28, 2009 |
| INVENTOR(S) | : Kazuo Komori |

Page 1 of 1

It is certified that error appears in the above-identified patent and that said Letters Patent is hereby corrected as shown below:

Column 14, Line 20, change "knuckle" to --a knuckle--.

Signed and Sealed this

Fourth Day of August, 2009

JOHN DOLL
*Acting Director of the United States Patent and Trademark Office*